(No Model.)

U. McCLINCHIE & J. F. BUTLER.
CHILD'S CARRIAGE.

No. 302,419. Patented July 22, 1884.

WITNESSES:

INVENTOR:

UNITED STATES PATENT OFFICE.

URIAH McCLINCHIE AND JAY F. BUTLER, OF NEW YORK, N. Y.

CHILD'S CARRIAGE.

SPECIFICATION forming part of Letters Patent No. 302,419, dated July 22, 1884.

Application filed April 24, 1884. (No model.)

*To all whom it may concern:*

Be it known that we, URIAH McCLINCHIE and JAY F. BUTLER, both of the city, county, and State of New York, have invented certain new and useful Improvements in Children's Carriages, of which the following is a full, clear, and exact description.

This invention relates to the bodies of children's carriages; and it consists in a novel construction of the body, with side or wheel fenders having upright guards mounted on them and set out from the body, substantially as hereinafter described, whereby a roomy and deep or high interior is insured for the body, as also greater safety and convenience for the child, the guards and fenders mutually support each other, and the body generally is strengthened; likewise a neater and more ornamental appearance is given to the carriage.

Reference is to be had to the accompanying drawings, forming part of this specification, in which similar letters of reference indicate corresponding parts in both the figures.

Figure 1:
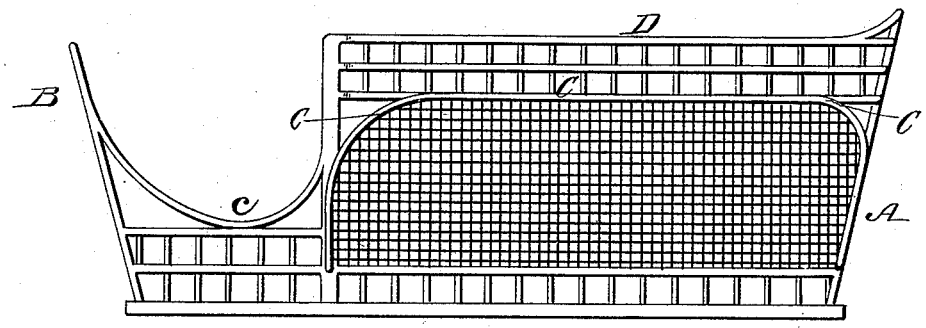
Figure 2:
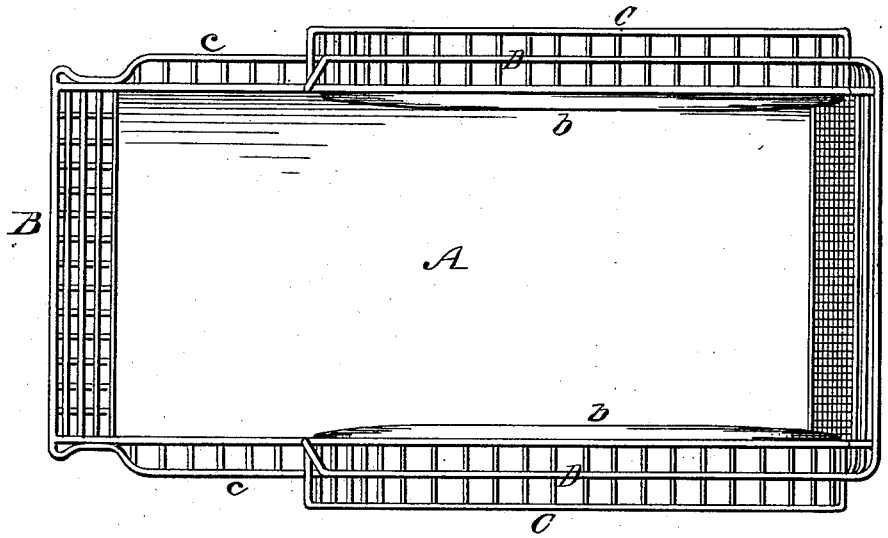

Figure 1 represents a side view of the body of a child's carriage having our improvement applied, and Fig. 2 is a plan of the same.

A indicates the body of the carriage, which, as well as the upright dash-board B, side or wheel fenders, C C, and upright guards D D, mounted on the fenders, may be made of cane-stock or any other suitable material or materials, and of any desired open-work or other pattern.

The body A, which may be of the usual or any suitable depth and width, is designed to be upholstered, as shown at *b;* but, in order not to cramp the interior of the body, it is preferred to have the upholstery stop short at the body, and not to extend it to the fenders and guards, which, however, if desired, may be faced or covered with any light or fancy material. The shape of the body may vary, and it may either be made with the ordinary front side openings, *c*, or its sides may be extended in an unbroken line to the dash-board.

The side or wheel fenders C C may either extend the whole length of the body or only partially so, and be of a straight contour parallel with the top or upper portion of the body, from which they project laterally to any desired width or distance. Mounted on these fenders, and set out from the body, are the upright guards D D, which may extend the whole length of the fenders, and be of any desired depth or height. These guards are not only a protection to the child, but by their set-off position relatively to the body they give a more roomy interior than if the upholstered body of a given width were extended as high up as the top of the guards, and they likewise form a walled rest, if necessary, for the child's arms and protection for its hands. Said guards, by their set-off position, furthermore, perform the very important duty of supporting the fenders and keeping them from sagging, likewise of stiffening the body, generally, with which they are connected, and the fenders and guards mutually support each other. Such guards might be arranged along the outside edges of the fenders, so as to give increased capacity to the interior of the carriage; but it is preferred, as here shown, to make the fenders of a handsome and safe or serviceable width, and to mount the guards on the fenders intermediately of their width, which will give a neater and lighter appearance and they will be sufficiently set off from the body to prevent the fenders from sagging, and the projecting portions of the fenders will also protect the guards.

Having thus described our invention, we claim as new and desire to secure by Letters Patent—

1. A child's carriage body provided with side or wheel fenders having upright guards set off from the body, mounted on and along them, substantially as specified.

2. The combination, with the body of the carriage and its side fenders, of the upright guards set off from the body, and mounted on and along the fenders intermediately of their width, essentially as described.

URIAH McCLINCHIE.
JAY F. BUTLER.

Witnesses:
A. GREGORY,
C. SEDGWICK.